United States Patent
Lee

[11] Patent Number: 5,873,657
[45] Date of Patent: Feb. 23, 1999

[54] CONIC FLUID BEARING AND HEAD DRUM AND SPINDLE MOTOR EACH INCLUDING THE SAME

[75] Inventor: Min-soo Lee, Kyungki-do, Rep. of Korea

[73] Assignee: Samsung Electronics Co., Ltd., Kyungki-Do, Rep. of Korea

[21] Appl. No.: 865,142

[22] Filed: May 29, 1997

[30] Foreign Application Priority Data

May 30, 1996 [KR] Rep. of Korea .................. 96 18739

[51] Int. Cl.⁶ ........................................ F16C 17/10
[52] U.S. Cl. ............................... 384/110; 384/912
[58] Field of Search ................... 384/110, 912, 384/108, 109, 112

[56] References Cited

FOREIGN PATENT DOCUMENTS

| 87/04486 | 7/1987 | WIPO | ............................. E21B 4/02 |
| 93/15545 | 8/1993 | WIPO | ............................. H02K 5/167 |

*Primary Examiner*—Lenard A. Footland
*Attorney, Agent, or Firm*—Sughrue, Mion, Zinn, Macpeak & Seas, PLLC

[57] ABSTRACT

A conic fluid bearing includes a bush fixed to a rotary body. The bush has upper and lower portions on which conic cavities are opposingly formed, respectively. Upper and lower cones fit on a shaft fixed to a fixed body and are rotatably combined with said upper and lower conic cavities, respectively.

15 Claims, 6 Drawing Sheets

2

CONIC FLUID BEARING AND HEAD DRUM AND SPINDLE MOTOR EACH INCLUDING THE SAME

BACKGROUND OF THE INVENTION

The present invention relates to a conic fluid bearing, and to a head drum and spindle motor each including the same.

Fluid bearings are installed in places requiring high-speed rotation, such as, a disk driving spindle motor of a hard disk, a rotary polygonal mirror driving motor of a laser printer, a head drum driving spindle motor of a VCR, since fluid bearings provide secure and stable rotation at high speed rotations.

FIG. 1 shows a head drum 1 on which a fluid bearing 2 is installed according to the prior art, and FIG. 2 is a detailed drawing showing the configuration of the fluid bearing. Referring to FIGS. 1 and 2, a hemispherical fluid bearing 2 used in the head drum 1 is comprised of a bush 3, an upper hemisphere 4, a lower hemisphere 5 and a spacer 6.

The bush 3 is cylindrical, and hemispherical cavities 8 and 8' are formed on the upper and lower portions thereof to be respectively combined with the upper and lower hemispheres 4 and 5. A bush hole 7 is formed between the hemispherical cavities 8 and 8'. Through holes 9 and 9' having a smaller diameter than that of the bush hole 7 are formed through the upper and lower hemispheres 4 and 5.

The bush 3 is fixed to a rotary transformer 101 connected to a rotating upper drum 100 such that it rotates together with the upper drum 100. The upper and lower hemispheres 4 and 5 are compressedly fixed to a shaft 11 of a stationary fixed drum 102. The upper and lower hemispheres 4 and 5 are inserted to combine with the hemispherical cavities 8 and 8' formed on the bush 3, and the spacer 6 fits with the shaft 11 between the upper and lower hemispheres 4 and 5 and is situated in the bush hole 7.

In order to manufacture the fluid bearing 2 to be used in a head drum as described above, the bush 3 and the upper and lower hemispheres 4 end 5 are processed through machining, and the hemispherical cavities 8 and 8' in the bush 3 are ground using a lapping machine and then assembled. Also, the hemispherical cavities 8 and 8' and the upper and lower hemispheres 4 and 5 must be precisely processed. Therefore, machining is difficult, and it takes many hours to process. Furthermore, since the spacer 6 must be assembled to be situated in the bush hole 7 between the upper and lower hemispheres 4 and 5, it is difficult to set the size accurately. These disadvantages result in deterioration of productivity.

SUMMARY OF THE INVENTION

It is an object of the present invention to provide a conic fluid bearing whereby production time can be reduced, precision in the size and the machining of the shape can be increased, and the assembly is easy.

It is another object of the present invention to provide a head drum and a spindle motor each including the fluid bearing.

To accomplish the first object, there is provided a conic fluid bearing comprising: a bush operative to be fixed to a rotating body and defining upper and lower portions, said bush having upper and lower conic cavities which are opposingly formed at the upper and lower portions, respectively, of the bush and a bush hole which is formed between the conic cavities; upper and lower cones rotatably combined with the upper and lower conic cavities, respectively, and each having a through hole communicating with the bush hole formed therethrough; a ring-shaped spacer situated in the bush hole between the upper and lower cones; and a shaft operative to be fixed to a stationary fixed body and fit into the through holes to support the upper and lower cones.

To accomplish the second object, there is provided a head drum comprising: a fixed drum fixed to a baseframe; a rotary drum rotatably installed on the fixed drum; and a fluid bearing including a bush fixed to the rotary drum, said bush having upper and lower portions on which upper and lower conic cavities, respectively, are opposingly formed, and in which a bush hole is formed between the conic cavities, upper and lower cones rotatably combined with the upper and lower conic cavities, respectively, and in each of which a through hole communicating with the bush hole is formed, a ring-shaped spacer situated in the bush hole between the upper and lower cones, and a shaft fixed to the fixed drum and fit into the through holes for supporting the upper and lower cones.

According to another aspect of the present invention, there is provided a spindle motor comprising: a housing fixed to a baseframe; a hub rotatably installed on the housing; and a fluid bearing including a bush fixed to the hub, said bush having upper and lower portions on which upper and lower conic cavities, respectively, are opposingly formed, and in which a bush hole is formed between the conic cavities, upper and lower cones rotatably combined with the upper and lower conic cavities, respectively, and in each of which a through hole communicating with the bush hole is formed, a ring-shaped spacer situated in the bush hole between the upper and lower cones, and a shaft fixed to the housing and fit into the through hole for supporting the upper and lower cones.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE INVENTION

Figure 3:
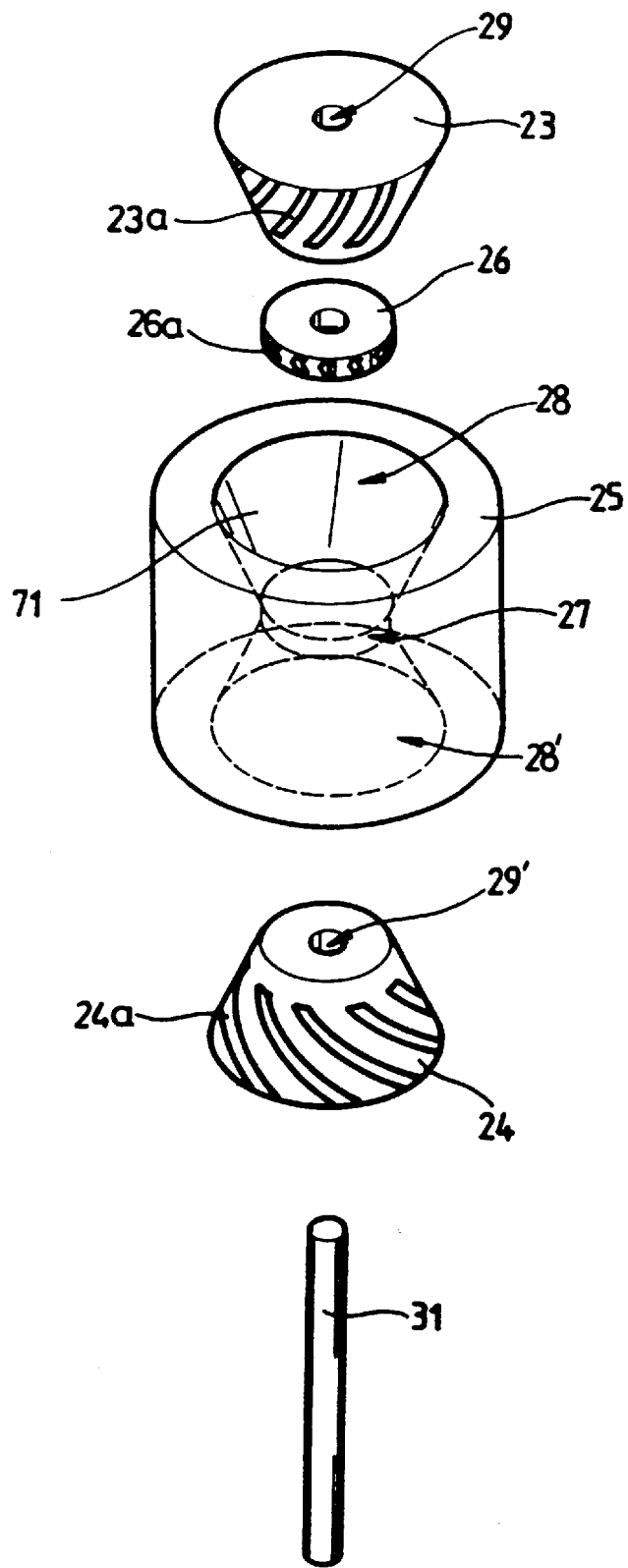
FIG. 3 is an exploded perspective view of a conic fluid bearing according to the present invention.

Referring to FIG. 3, a conic fluid bearing according to the present invention is comprised of an upper cone 23, a lower cone 24, a bush 25 and a spacer 26.

The bush 25 is cylindrical, and conic cavities 28 and 28' for combining with the upper and lower cones 23 and 24 are formed on the upper and lower portions thereof, respectively. A bush hole 27 is formed between the conic cavities 28 and 28'. Also, through holes 29 and 29' having smaller diameters than that of the bush hole 27 are formed in the upper and lower cones 23 and 24, respectively.

The upper and lower cones 23 and 24 are inserted to combine with the conic cavities 28 and 28' formed in the bush 25. Grooves 23a, 24a and 26a are formed on the outer circumferential surfaces of the upper and lower cones 23 and 24 and the spacer 26, respectively, such that the contact area with the bush 25 is small so that the bush smoothly rotates with the upper and lower cones 23 and 24 and the spacer 26.

It is preferable that the upper and lower cones 23 and 24 and the spacer 26 are made of a high carbon steel or WCo and the bush 25 is made of a ceramic such as $Al_2O_3$.

Figure 6:
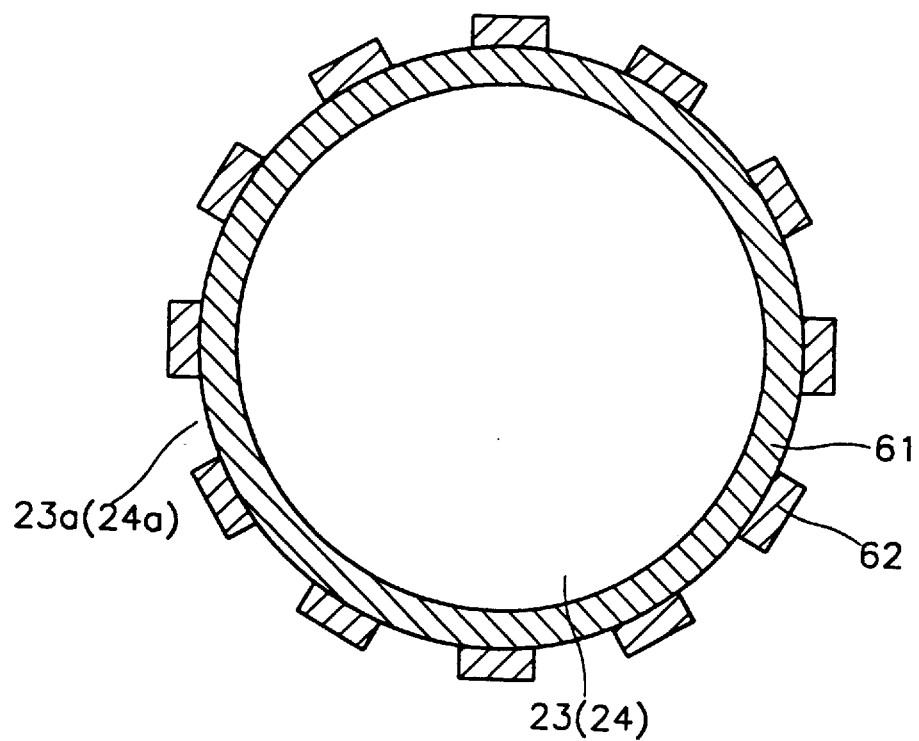
FIG. 6 is a horizontal section view of either of the upper and lower cones of FIG. 3.

As shown in FIG. 6, a titanium (Ti) coating film 61 having a thickness not exceeding 20 μm is formed on the outer circumferential surface of the upper and lower cones 23 and 24 and the spacer (not shown), and diamond like carbon (DLC) coating films 62 having a thickness of not more than 10 μm are intermittently formed at predetermined intervals on the titanium coating film 61. It is preferable that the DLC coating films 62 are formed spirally with respect to the axial direction of the upper and lower cones 23 and 24. The grooves 23a and 24a are formed between the DLC coating films 62. The grooves 23a and 24a raise the upper and lower cones 23 and 24 with respect to the bush 25 due to the pressure generated by the inflow of oil or air during the rotation, so that they minimize friction between the upper and lower cones 23 and 24 and the bush 25.

The DLC coating film 62 has a coefficient of linear expansion similar to that of titanium so that problems such as flaking and clearance changes do not occur, and the DLC coating film is stronger with regard to friction than titanium. Alternatively, the grooves can be formed by forming titanium coating films instead of the DLC coating films 62.

Also, titanium coating films (not shown) of not more than 20 μm thickness can be formed on the inner circumferential surfaces of the conic holes 28 and 28' to be combined with the upper and lower cones 23 and 24.

Figure 1:
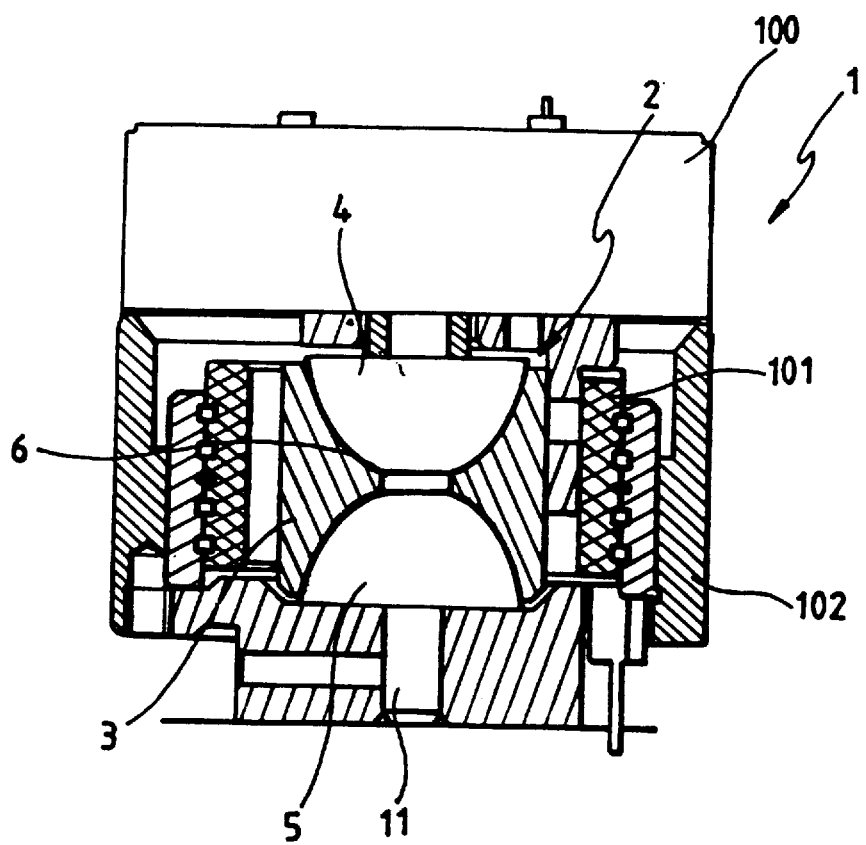
FIG. 1 is a partial cross-sectional view of a head drum in which a conventional hemispherical fluid bearing is installed.
Figure 2:
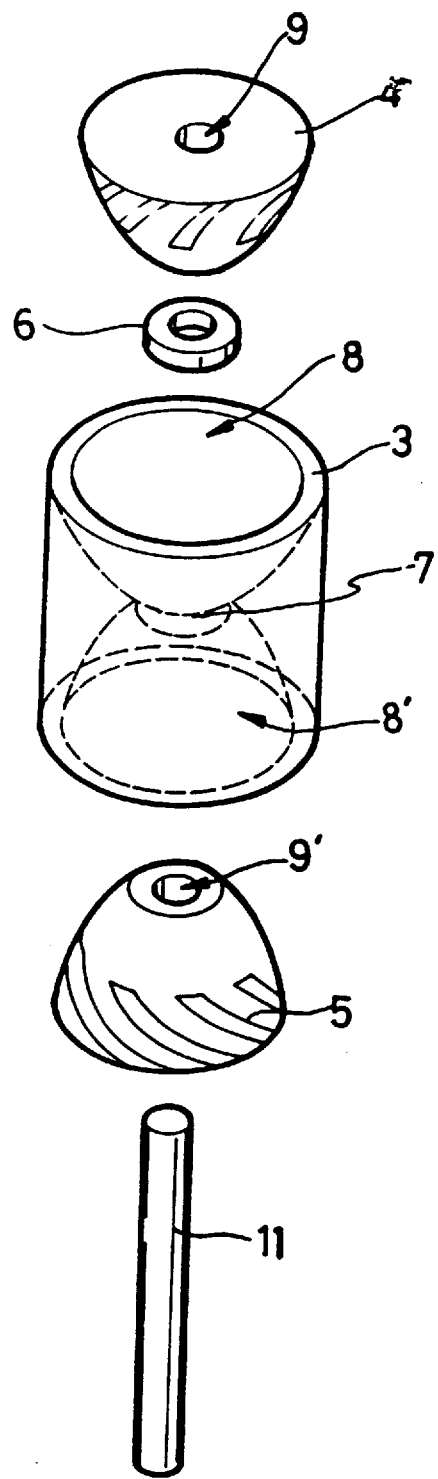
FIG. 2 is an exploded perspective view of the conventional hemispherical fluid bearing.
Figure 4:
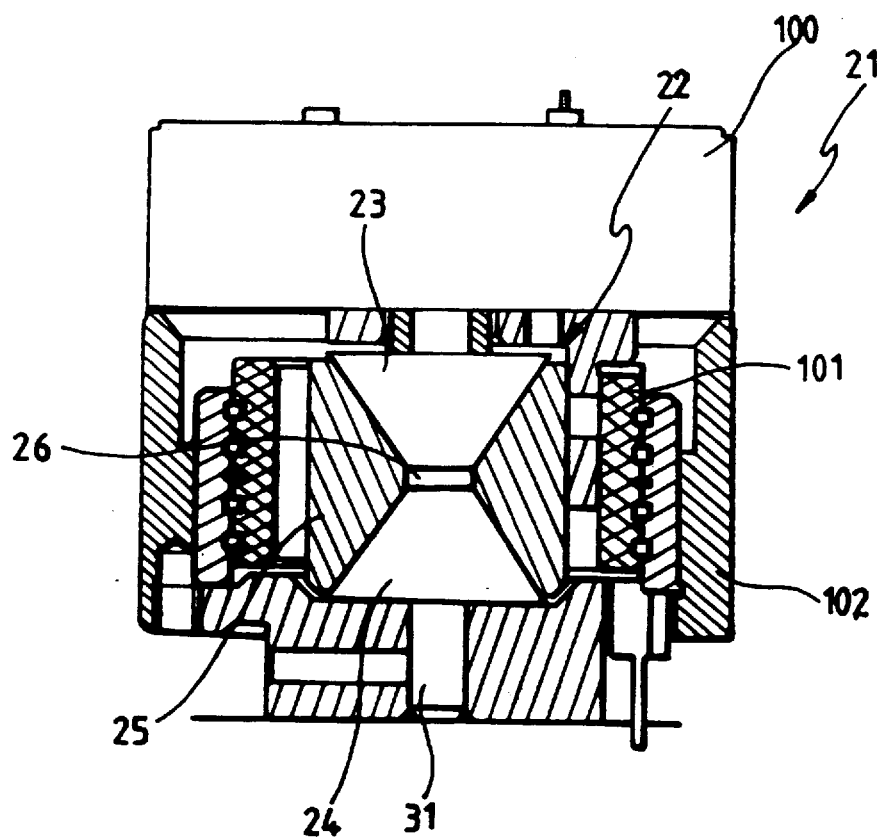
FIG. 4 is a cross-sectional view of a head drum in which the conic fluid bearing of FIG. 3 is installed.

FIG. 4 shows a head drum on which the conic fluid bearing having such a configuration is installed. In FIG. 4, like elements are denoted by like reference numbers with reference to the head drum shown in FIG. 1. As shown in FIG. 4, the bush 25 is fixed to a rotary transformer 101 connected to a rotating upper drum 100 such that it rotates with the upper drum 100. The upper and lower cones 23 and 24 fit on a shaft 31 of the fixed drum 102 fixed to a baseframe (not shown). The spacer 26 also fits on the shaft 31 between the upper and lower cones 23 and 24 and is situated in a bush hole 27 of the bush 25.

In the operation of the head drum having the conic fluid bearing according to the present invention installed thereon, a stable and smooth rotation is secured when the upper drum 100 is rotated by a motor (not shown).

Figure 5:
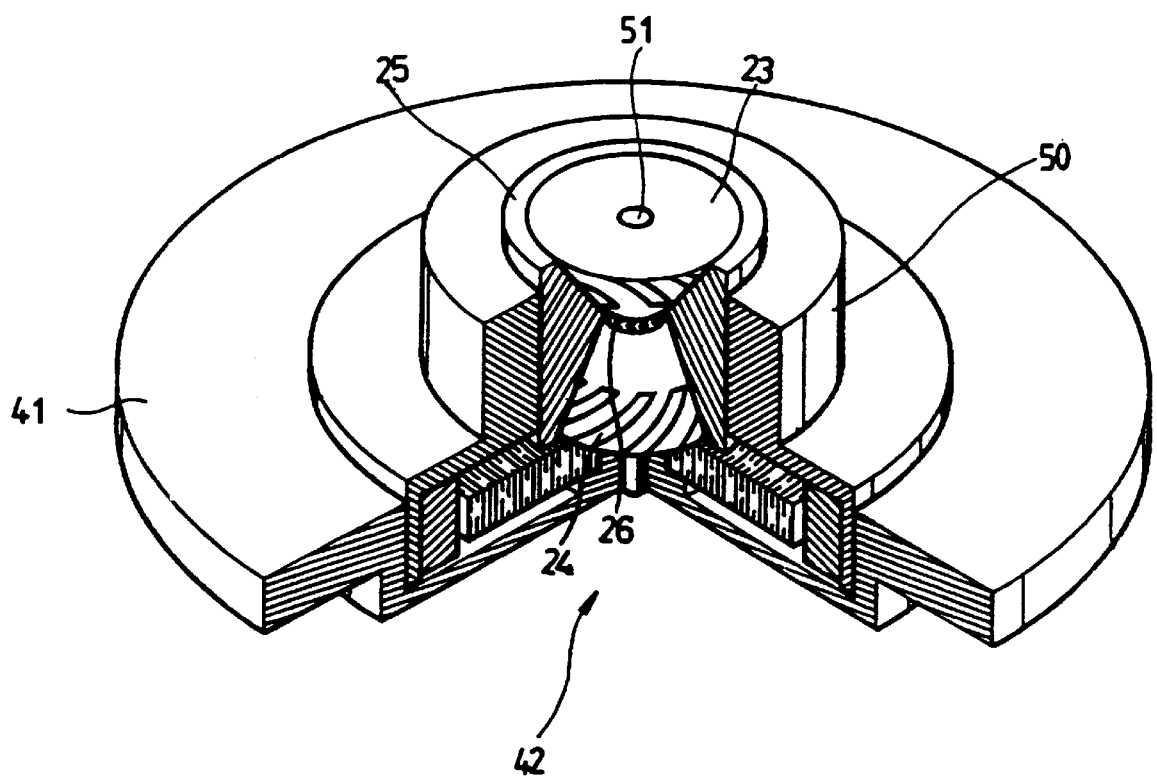
FIG. 5 is a partially-cut away perspective view of a spindle motor on which a conic fluid bearing according to the present invention is installed.

FIG. 5 shows a spindle motor 42 having the conic fluid bearing according to the present invention installed thereon. Again, like reference numerals as those in the previous drawings denote like elements. Referring to FIG. 5, the bush 25 is fixed to a hub 50 such that it rotates with the hub 50. The upper and lower cones 23 and 24 fit on a shaft 51 of a housing 41 fixed to a baseframe (not shown). Also, the spacer 26 fits on the shaft 51 between the upper and lower cones 23 and 24 and is situated in the bush hole 27 (see FIG. 3) of the bush 25.

In the operation of the spindle motor having the conic fluid bearing according to the present invention installed thereon, a stable and smooth rotation is secured when the hub 50 is rotated by a motor (not shown).

As described above, since in the conic fluid bearing according to the present invention, there is no need to process curves and only linear processing is required, machining is easily performed as compared to a conventional hemispherical fluid bearing and the precision in size and machining of the shape can be improved. Also, the assembly of the fluid bearing is easy and fast, and abrasions generated due to the friction between the cones and the bush can be prevented.

Furthermore, in the head drum and the spindle motor adopting the conic fluid bearing according to the present invention, the assembly of the fluid bearing is easy, and a smooth rotation is accomplished during operation.

It is contemplated that numerous modifications may be made to the conic fluid bearing of the present invention without departing from the spirit and scope of the invention as defined in the following claims.

What is claimed is:

1. A conic fluid bearing comprising:
   a bush operative to be fixed to a rotating body and defining upper and lower portions, said bush having upper and lower conic cavities which are opposingly formed at the upper and lower portions, respectively, of said bush and a bush hole which is formed between said conic cavities, said conic cavities tapering linearly;
   upper and lower cones rotatably combined with said upper and lower conic cavities, respectively, and each having a through hole communicating with said bush hole formed therethrough;
   a ring-shaped spacer situated in said bush hole between said upper and lower cones; and
   a shaft operative to be fixed to a stationary fixed body and fit into said through holes to support said upper and lower cones.

2. The conic fluid bearing as claimed in claim 1, wherein grooves are formed on outer circumferential surfaces of at least one of said upper and lower cones and said spacer.

3. The conic fluid bearing as claimed in claim 1, wherein a titanium coating film is formed on at least one surface among outer circumferential surfaces of said upper and lower cones and said spacer or inner circumferential surfaces of said conic cavities.

4. The conic fluid bearing as claimed in claim 3, wherein said titanium coating film has a thickness which is between 5 μm and 20 μm.

5. The conic fluid bearing as claimed in claim 3, wherein diamond like carbon (DLC) coating films are intermittently coated at predetermined intervals on said titanium coating film formed on the outer circumferential surfaces of said upper and lower cones and said spacer, so that grooves are formed between said DLC coating films.

6. The conic fluid bearing as claimed in claim 5, wherein each of said DLC coating films has a thickness which is not more than 10 μm.

7. The conic fluid bearing as claimed in claim 3, wherein said bush is made of a ceramic.

8. A spindle motor comprising:
   a housing fixed to a base frame;
   a hub rotatably installed on said housing; and
   a fluid bearing including a bush fixed to said hub, said bush having upper and lower portions on which upper and lower conic cavities, respectively, are opposingly formed, and in which a bush hole is formed between said conic cavities, said conic cavities tapering linearly,
   upper and lower cones rotatably combined with said upper and lower conic cavities, respectively, and in each of which a through hole communicating with said bush hole is formed, a ring-shaped spacer situated in said bush hole between said upper and lower cones, and a shaft fixed to said housing and fit into said through hole for supporting said upper and lower cones.

9. The spindle motor as claimed in claim 8, wherein grooves are formed on outer circumferential surfaces of at least one of said upper and lower cones and said spacer.

10. The spindle motor as claimed in claim 8, wherein a titanium coating film is formed on at least one surface among outer circumferential surfaces of said upper and lower cones and said spacer or inner circumferential surfaces of said conic holes.

11. The spindle motor as claimed in claim 10, wherein said titanium coating film has a thickness which is between 5 $\mu$m and 20 $\mu$m.

12. The spindle motor as claimed in claim 8, wherein diamond like carbon (DLC) coating films are coated at predetermined intervals on said titanium coating film formed on the outer circumferential surfaces of said upper and lower cones and said spacer, so that grooves are formed between said DLC coating films.

13. The spindle motor as claimed in claim 12, wherein each of said DLC coating films has a thickness which is not more than 10 $\mu$m.

14. A conic fluid bearing comprising:

a bush operative to be fixed to a rotating body and defining upper and lower portions, said bush having upper and lower conic cavities which are opposingly formed at the upper and lower portions, respectively, of said bush and a bush hole which is formed between said conic cavities;

upper and lower cones rotatably combined with said upper and lower conic cavities, respectively, and each having a through hole communicating with said bush hole formed therethrough;

a ring-shaped spacer situated in said bush hole between said upper and lower cones; and a shaft operative to be fixed to a stationary fixed body and fit into said through holes to support said upper and lower cones, wherein a titanium coating film is formed on at least one surface among outer circumferential surfaces of said upper and lower cones and said spacer or inner circumferential surfaces of said conic cavities.

15. A spindle motor comprising:

a housing fixed to a base frame;

a hub rotatably installed on said housing; and a fluid bearing including a bush fixed to said hub, said bush having upper and lower portions on which upper and lower conic cavities, respectively, are opposingly formed, and in which a bush hole is formed between said conic cavities, upper and lower cones rotatably combined with said upper and lower conic cavities, respectively, and in each of which a through hole communicating with said bush hole is formed, a ring-shaped spacer situated in said bush hole between said upper and lower cones, and a shaft fixed to said housing and fit into said through hole for supporting said upper and lower cones, wherein a titanium coating film is formed on at least one surface among outer circumferential surfaces of said upper and lower cones and said spacer or inner circumferential surfaces of said conic holes.

* * * * *